(12) United States Patent
Matsuzawa

(10) Patent No.: US 11,321,024 B2
(45) Date of Patent: May 3, 2022

(54) METHOD OF CONTROLLING PRINTING SYSTEM AND NON-TRANSITORY COMPUTER-READABLE STORAGE MEDIUM STORING PROGRAM INCLUDING A TWO-DIMENSIONAL CODE INCLUDING INFORMATION THAT IDENTIFIES REGISTERED PRINT DATA AND INFORMATION THAT IDENTIFIES PAYMENT TOKEN INFORMATION

(71) Applicant: SEIKO EPSON CORPORATION, Tokyo (JP)

(72) Inventor: Tomoki Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/103,619

(22) Filed: Nov. 24, 2020

(65) Prior Publication Data

US 2021/0157531 A1    May 27, 2021

(30) Foreign Application Priority Data

Nov. 26, 2019  (JP) .............................. JP2019-212998

(51) Int. Cl.
*G06F 3/12* (2006.01)
*G06K 19/06* (2006.01)
(Continued)

(52) U.S. Cl.
CPC .......... *G06F 3/1203* (2013.01); *G06F 3/1238* (2013.01); *G06F 3/1285* (2013.01); *G06K 19/06037* (2013.01); *G06Q 20/40* (2013.01)

(58) Field of Classification Search
CPC .... G06F 3/1203; G06F 3/1238; G06F 3/1285; G06Q 20/145; G06Q 20/209;
(Continued)

(56) References Cited

U.S. PATENT DOCUMENTS 7,124,094 B1* 10/2006 Kobayashi ........... G06Q 20/382
                                                        705/64
2013/0235418 A1* 9/2013 Tanaka ................ H04N 1/00228
                                                        358/1.15
(Continued)

FOREIGN PATENT DOCUMENTS

JP    2007-048188    2/2007
JP    2013-146915    8/2013
JP    2015-197873    11/2015

*Primary Examiner* — Chad Dickerson
(74) *Attorney, Agent, or Firm* — Workman Nydegger

(57) ABSTRACT

A method of controlling a printing system includes requesting, by an information processing apparatus included in the printing system, using electronic payment identification information regarding an electronic payment service, an electronic payment server included in the printing system to perform an authentication, requesting, by the information processing apparatus, using information associated with the electronic payment identification information as print identification information regarding cloud printing, a cloud print server included in the printing system to perform an authentication, and after the authentication, and registering, in the cloud print server, print data that is associated with the electronic payment service and acquiring, by the information processing apparatus, the registration information regarding the electronic payment service and the cloud printing.

4 Claims, 7 Drawing Sheets

| ELECTRONIC PAYMENT SERVICE | SID | USER ID IN ELECTRONIC PAYMENT SERVICE | PRINT SERVER ID |
|---|---|---|---|
| COMPANY A | 001 | abcdefg | 001 : abcdefg |
| COMPANY A | 001 | abc_efg | 001 : abc_efg |
| COMPANY B | 002 | hij_klm | 002 : hij_klm |
| COMPANY C | 003 | nopr | 003 : nopr |

(51) Int. Cl.
*G06Q 20/40* (2012.01)
*H04N 1/00* (2006.01)
(58) Field of Classification Search
CPC ...... G06Q 20/40; G06Q 20/401; G07F 17/42; H04N 1/34; H04N 1/342; H04N 1/344; H04N 1/346; H04N 1/00204; H04N 1/00222; H04N 1/0023; H04N 1/00238; H04N 1/00244; H04N 1/4426
USPC ........ 358/1.11–1.18; 709/201–203, 217–219
See application file for complete search history.

(56) References Cited

U.S. PATENT DOCUMENTS

| | | | |
|---|---|---|---|
| 2016/0086144 A1* | 3/2016 | Kishida | G07F 17/26 705/40 |
| 2017/0070638 A1* | 3/2017 | Min | G06F 21/608 |
| 2018/0082270 A1* | 3/2018 | Sun | G06Q 20/28 |

* cited by examiner

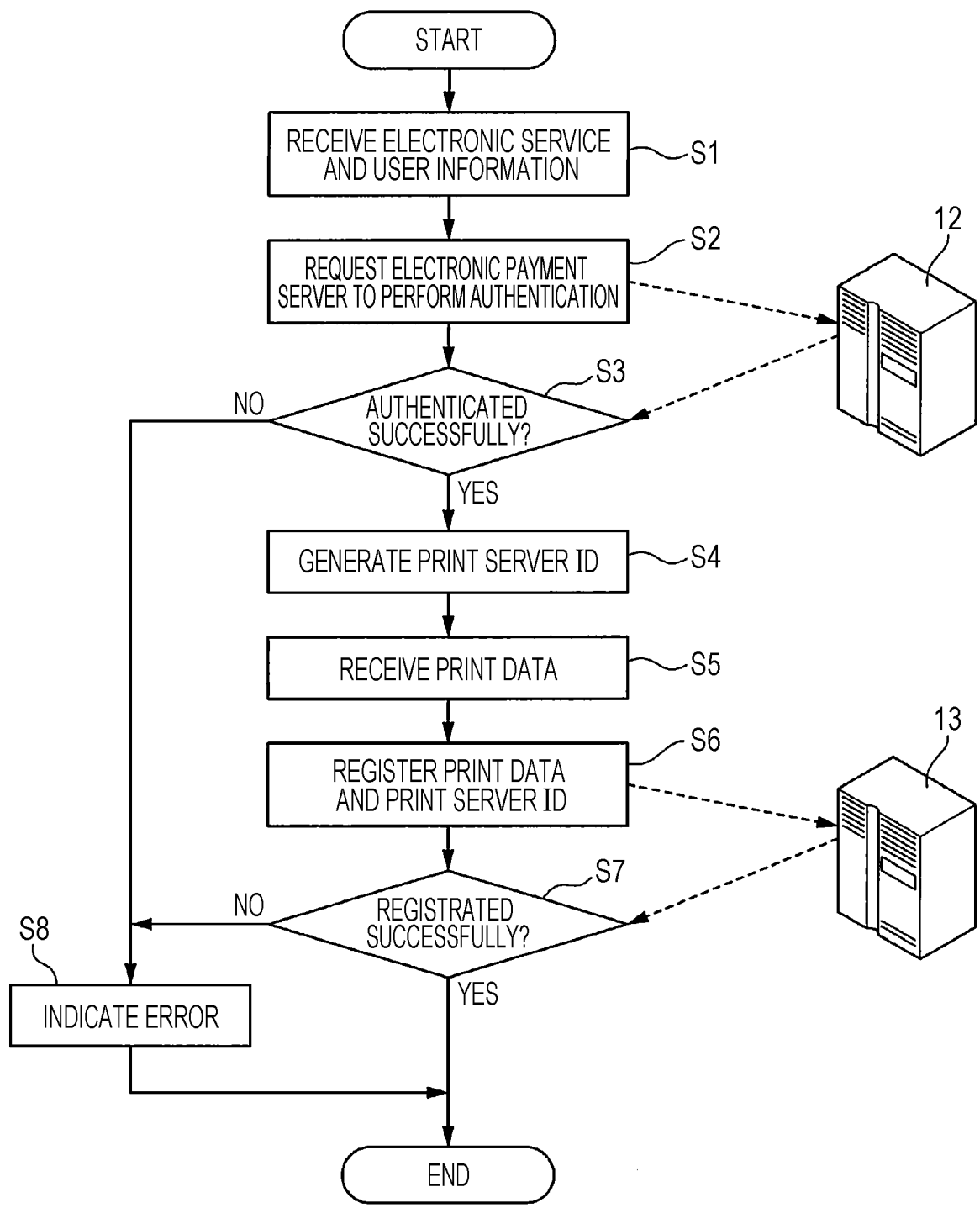

METHOD OF CONTROLLING PRINTING SYSTEM AND NON-TRANSITORY COMPUTER-READABLE STORAGE MEDIUM STORING PROGRAM INCLUDING A TWO-DIMENSIONAL CODE INCLUDING INFORMATION THAT IDENTIFIES REGISTERED PRINT DATA AND INFORMATION THAT IDENTIFIES PAYMENT TOKEN INFORMATION

The present application is based on, and claims priority from JP Application Serial Number 2019-212998, filed Nov. 26, 2019, the disclosure of which is hereby incorporated by reference herein in its entirety.

BACKGROUND

1. Technical Field

Embodiments relates to a method of controlling a printing system and a non-transitory computer-readable storage medium storing a program.

2. Related Art

Cloud printing technology, technology for printing from a printing apparatus over the cloud, is known. Also known are electronic payment services for electronically paying a printing fee.

JP-A-2007-48188 describes a method of performing electronic money payment of a print job using a non-contact IC card. In this method, an instruction for a print job is transferred over a network and printing is performed.

JP-A-2015-197873 describes an apparatus that creates a directory that corresponds to an electronic money terminal and prints image data in the directory.

In some cases, however, such known technology may be inconvenient for users in performing cloud print processing and electronic payment processing. For example, in the technique in JP-A-2015-197873, when the cloud printing service is provided by a company that provides the electronic payment service, the electronic payment can be processed using only identification information about the electronic payment, whereas when the company that provides the cloud printing service is different from the company that provides the electronic payment service, the processing may not be smoothly processed. In particular, such processing is difficult in current environments in which multiple electronic payment systems exist. These difficulties are not solved by the technique described in JP-A-2007-48188.

SUMMARY

To solve the above-mentioned problems, according to an aspect of the present disclosure, a method of controlling a printing system including an information processing apparatus, an electronic payment server, a cloud print server, and a printing apparatus is provided. The method includes requesting, by the information processing apparatus, using electronic payment identification information regarding an electronic payment service, the electronic payment server to perform an authentication, requesting, by the information processing apparatus, using information that is associated with the electronic payment identification information as print identification information regarding cloud printing, the cloud print server to perform an authentication, and after the authentication, and registering, in the cloud print server, print data that is associated with the electronic payment service, acquiring, by the information processing apparatus, the registration information regarding the electronic payment service and the cloud printing, and reading, by the printing apparatus, the registration information that is acquired by the information processing apparatus, performing the printing of the print data that is registered in the cloud print server based on the registration information, and based on the registration information, requesting the electronic payment server that corresponds to the electronic payment service based on the registration information to perform the electronic payment.

To solve the above-mentioned problems, according to another aspect of the present disclosure, a non-transitory computer-readable storage medium storing a program for causing a computer in an information processing apparatus to implement functions is provided. The program causes the computer in the information processing apparatus to implement functions including a function of requesting an authentication using electronic payment identification information regarding an electronic payment service, a function of requesting an authentication using information that is associated with the electronic payment identification information as print identification information regarding cloud printing, and after the authentication, and registering print data that is associated with the electronic payment service, a function of storing the registration information regarding the electronic payment service and the cloud printing, and a function of outputting the registration information.

BRIEF DESCRIPTION OF THE DRAWINGS

FIG. 9 illustrates an example procedure of processing that is performed in an information processing apparatus according to an embodiment.

DESCRIPTION OF EXEMPLARY EMBODIMENTS

Hereinafter, embodiments will be described with reference to the accompanying drawings.

Figure 1:
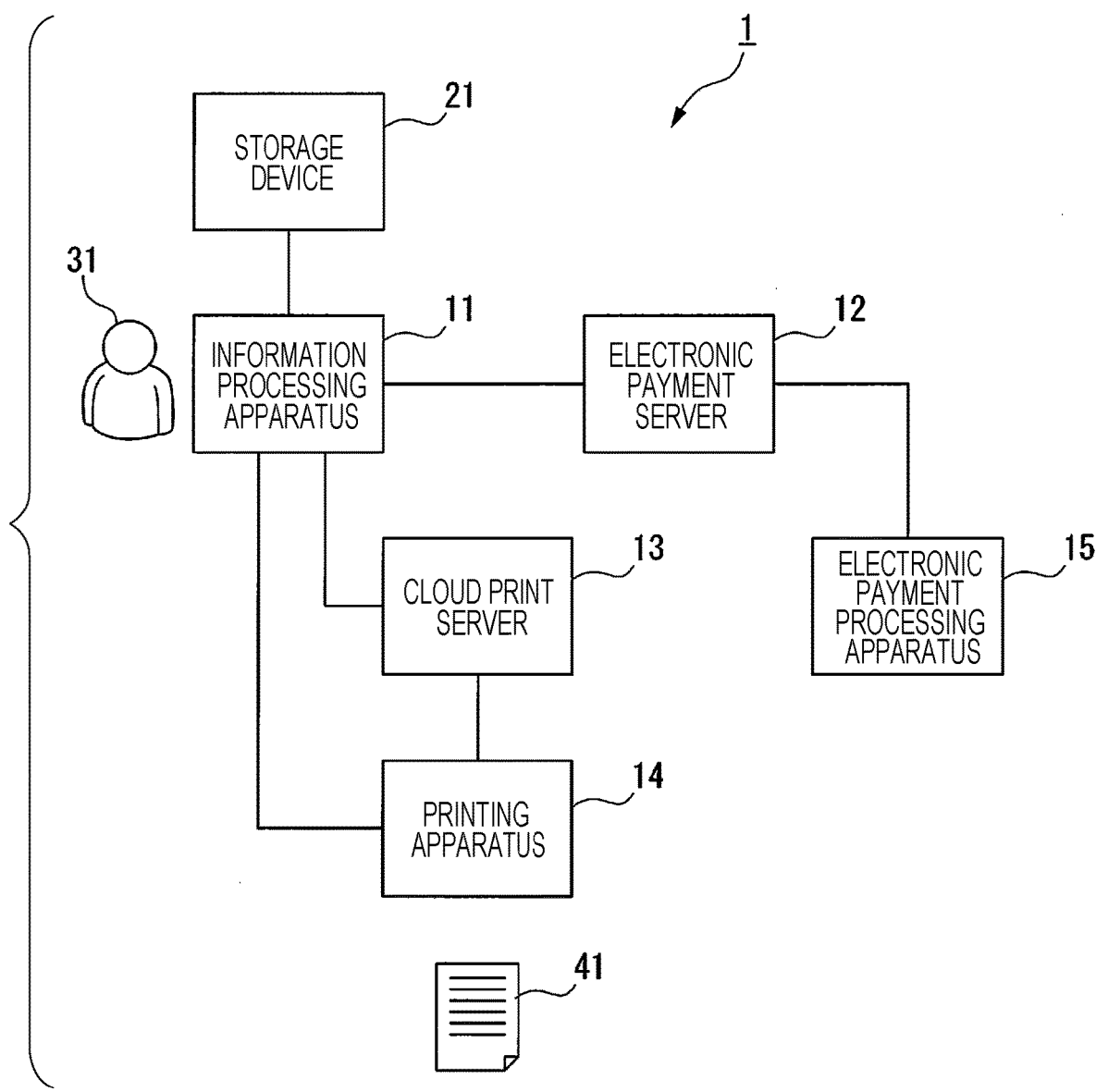
FIG. 1 schematically illustrates a printing system according to an embodiment.

FIG. 1 schematically illustrates a printing system 1 according to an embodiment. The printing system 1 includes an information processing apparatus 11, an electronic payment server 12, a cloud print server 13, and a printing apparatus 14. FIG. 1 illustrates also an electronic payment processing apparatus 15 and a storage device 21. It should be noted that one of or both of the electronic payment processing apparatus 15 and the storage device 21 may be provided in the printing system 1. FIG. 1 illustrates also a user 31 who operates the information processing apparatus 11 and a print product 41 that is created by the printing apparatus 14.

The information processing apparatus 11 individually communicates with the electronic payment server 12, the cloud print server 13, and the printing apparatus 14. The electronic payment server 12 individually communicates with the printing apparatus 14 and the electronic payment processing apparatus 15. The cloud print server 13 and the printing apparatus 14 communicate with each other.

Here, any two or more of the information processing apparatus 11, the electronic payment server 12, the cloud print server 13, the printing apparatus 14, the electronic payment processing apparatus 15, and the storage device 21 may be communicatably coupled via a network. The network may be, for example, the Internet.

The storage device 21 is communicatably coupled to the information processing apparatus 11. In this embodiment, the storage device 21 is used as an external storage device for the information processing apparatus 11. In this embodiment, print data or identification information stored in the storage device 21 is acquired by the information processing apparatus 11. The print data is data to be printed. The print data may be generated, for example, by the information processing apparatus 11 or may be generated by other computers. For example, the storage device 21 may not be provided when a storage device in the information processing apparatus 11 is used and the external storage device 21 is not used.

The electronic payment processing apparatus 15 is accessed from the electronic payment server 12 and performs electronic payment processing for a credit card or the like. The electronic payment processing apparatus 15 is managed, for example, by a credit card company. In this embodiment, the company that manages and operates the electronic payment processing apparatus 15 is different from the company that manages and operates the cloud print server 13.

Figure 2:
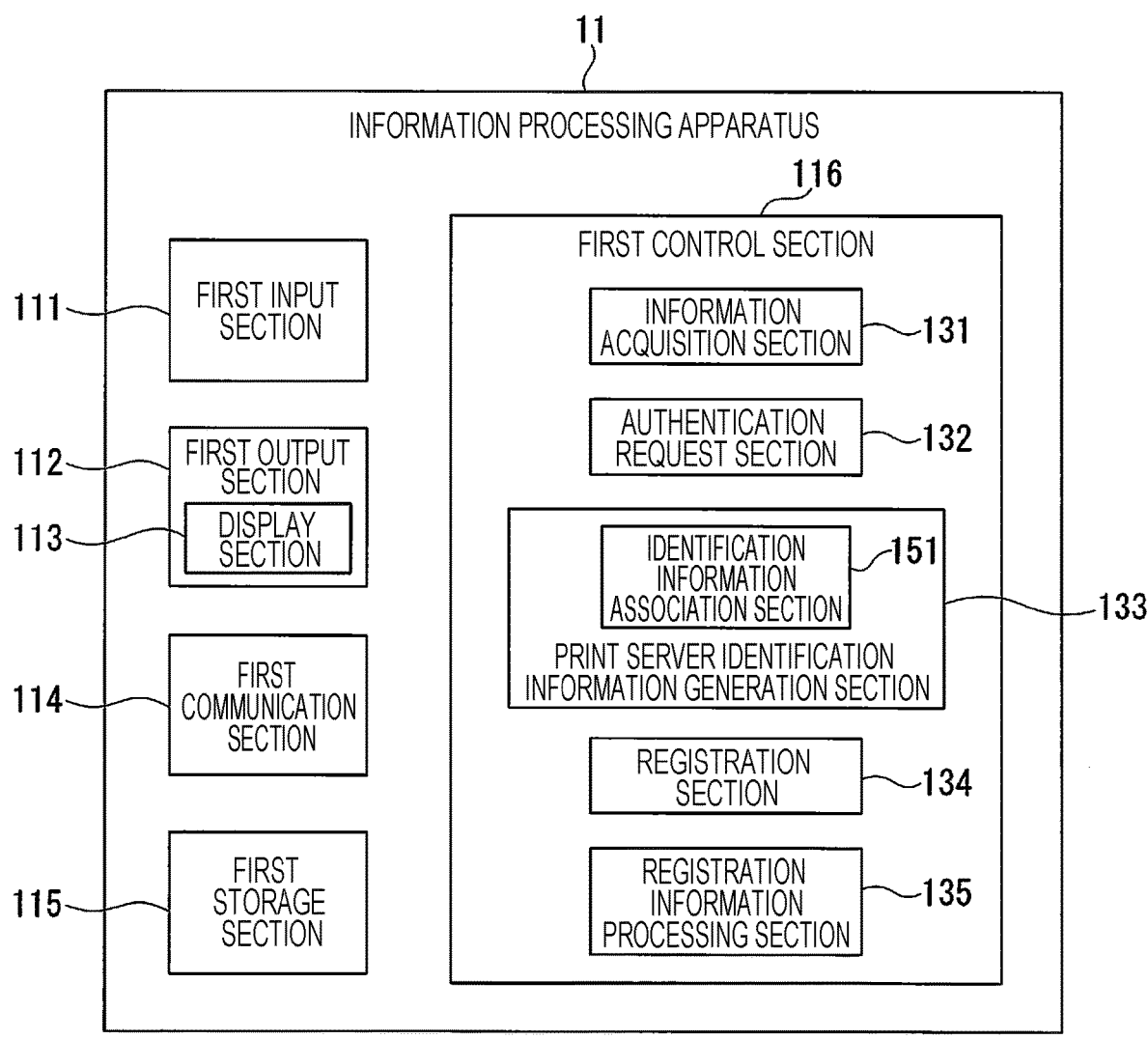
FIG. 2 is a functional block diagram illustrating a configuration of an information processing apparatus according to an embodiment.

FIG. 2 is a functional block diagram illustrating a configuration of the information processing apparatus 11 according to the embodiment. The information processing apparatus 11 includes a first input section 111, a first output section 112, a first communication section 114, a first storage section 115, and a first control section 116. The first output section 112 includes a display section 113. The first control section 116 includes an information acquisition section 131, an authentication request section 132, a print server identification information generation section 133, a registration section 134, and a registration information processing section 135. The print server identification information generation section 133 includes an identification information association section 151.

In this embodiment, in the information processing apparatus 11, a central processing unit (CPU) executes a predetermined program that is stored in the first storage section 115 to perform various processes. In this embodiment, such a program includes a program for an application that performs cloud print processing and electronic payment processing relating to printing.

The first input section 111 is provided with an operation section that is operated by the user 31 of the information processing apparatus 11. The operation section may be, for example, a keyboard or a mouse. The first output section 112 includes, for example, the display section 113 and a speaker that outputs sound. The display section 113 includes a screen for displaying information, and displays various kinds of information on the screen. In this embodiment, the display section 113 can display a two-dimensional code image on the screen. The first communication section 114 is an interface that communicates with other apparatuses. The first storage section 115 is a memory that stores various kinds of information.

The first control section 116 is a processor that performs various control processes. The information acquisition section 131 acquires various kinds of information. The information acquisition section 131 acquires, for example, information that is input through the first input section 111, information that is received through the first communication section 114, or information that is stored in the first storage section 115. The authentication request section 132 requests external servers to perform authentication. In this embodiment, the servers are the electronic payment server 12 and the cloud print server 13.

The identification information association section 151 associates a plurality of pieces of identification information. In this embodiment, the identification information association section 151 associates, for example, identification information regarding an electronic payment service that is performed using the electronic payment server 12 with identification information regarding cloud printing that is performed using the cloud print server 13. In this embodiment, the identification information regarding an electronic payment service includes a service ID and a user ID in the electronic payment service. In addition, in this embodiment, the identification information regarding cloud printing includes a print server ID. The print server identification information generation section 133 generates a print server ID.

The registration section 134 registers print data to the cloud print server 13. The registration information processing section 135 performs processing regarding registration information for executing cloud printing and electronic payment.

Figure 3:
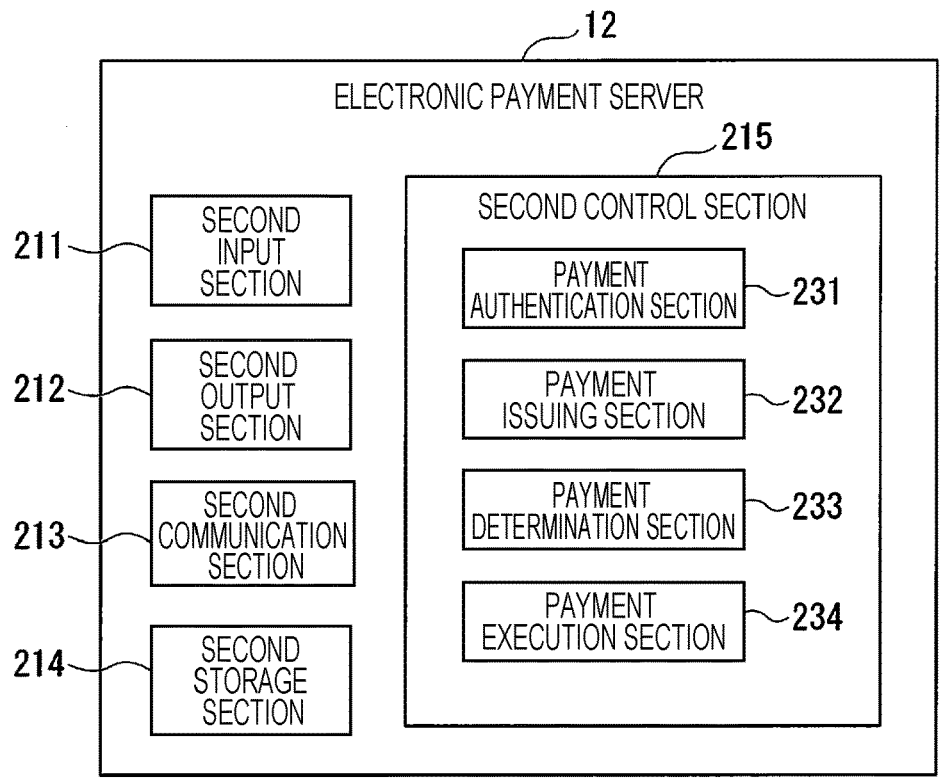
FIG. 3 is a functional block diagram illustrating a configuration of an electronic payment server according to an embodiment.

FIG. 3 is a functional block diagram illustrating a configuration of the electronic payment server 12 according to the embodiment. The electronic payment server 12 includes a second input section 211, a second output section 212, a second communication section 213, a second storage section 214, and a second control section 215. The second control section 215 includes a payment authentication section 231, a payment issuing section 232, a payment determination section 233, and a payment execution section 234.

The second input section 211 includes an operation section that is operated by an administrator of the electronic payment server 12. The operation section may be, for example, a keyboard or a mouse. The second output section 212 includes, for example, a screen for displaying information and a speaker that outputs sound. The second communication section 213 is an interface that communicates with other apparatuses. The second storage section 214 is a memory that stores various kinds of information.

The second control section 215 is a processor that performs various control processes. The payment authentication section 231 authenticates the information processing apparatus 11. The payment issuing section 232 issues information regarding a payment to the information processing apparatus 11. The payment determination section 233 makes a predetermined determination on the information regarding the payment that is received from the information processing apparatus 11. The payment execution section 234 executes payment processing. In this embodiment, the payment execution section 234 accesses the electronic payment processing apparatus 15 and requests the electronic payment processing apparatus 15 to execute payment processing. Then, the electronic payment processing apparatus 15 executes final payment processing.

Figure 4:
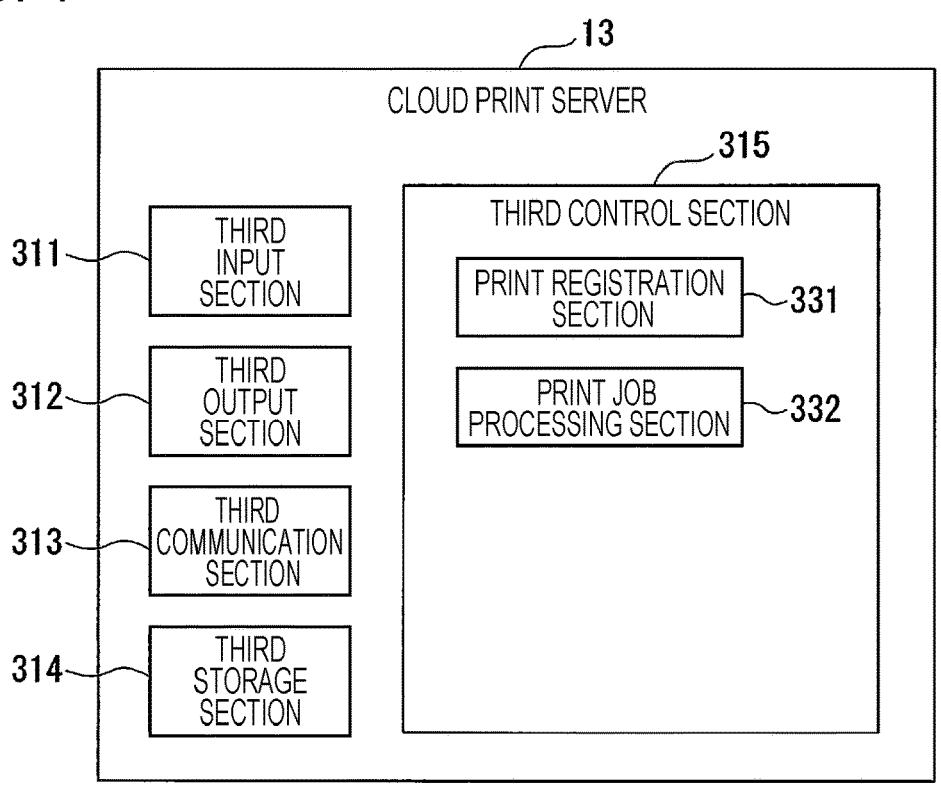
FIG. 4 is a functional block diagram illustrating a configuration of a cloud print server according to an embodiment.

FIG. 4 is a functional block diagram illustrating a configuration of the cloud print server 13 according to the embodiment. The cloud print server 13 includes a third input section 311, a third output section 312, a third communication section 313, a third storage section 314, and a third control section 315. The third control section 315 includes a print registration section 331 and a print job processing section 332.

The third input section 311 includes an operation section that is operated by an administrator of the cloud print server 13. The operation section may be, for example, a keyboard or a mouse. The third output section 312 includes, for example, a screen for displaying information and a speaker that outputs sound. The third communication section 313 is an interface that communicates with other apparatuses. The third storage section 314 is a memory that stores various kinds of information.

The third control section 315 is a processor that performs various control processes. The print registration section 331 registers, as a print job, a process for printing print data that is specified by the information processing apparatus 11. The print job processing section 332 executes print processing that corresponds to a registered print job.

In this embodiment, the administrator of the electronic payment server 12 is different from the administrator of the cloud print server 13.

Figure 5:
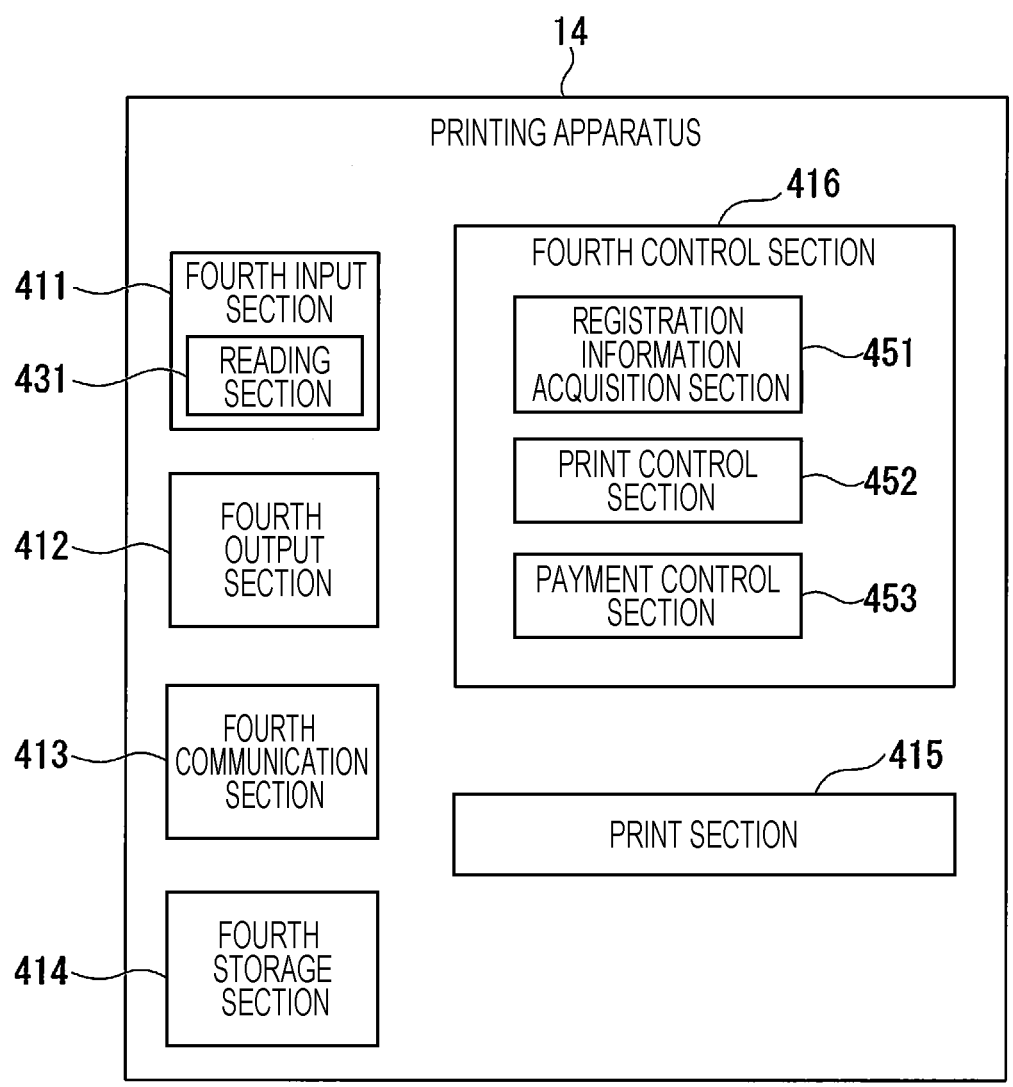
FIG. 5 is a functional block diagram illustrating a configuration of a printing apparatus according to an embodiment.

FIG. 5 is a functional block diagram illustrating a configuration of the printing apparatus 14 according to the embodiment. The printing apparatus 14 includes a fourth input section 411, a fourth output section 412, a fourth communication section 413, a fourth storage section 414, a print section 415, and a fourth control section 416. The fourth input section 411 includes a reading section 431. The fourth control section 416 includes a registration information acquisition section 451, a print control section 452, and a payment control section 453.

The fourth input section 411 includes an operation section that is operated by the user 31 of the printing apparatus 14. The operation section may be, for example, a control panel or keys. The reading section 431 reads information of an image represented on a paper sheet or the like that is placed over a predetermined portion of the printing apparatus 14. In this embodiment, the reading section 431 reads an image of a two-dimensional code. The reading section 431 may have, for example, a function of a camera or a scanner.

The fourth output section 412 includes, for example, a screen for displaying information and a speaker that outputs sound. It should be noted that the fourth input section 411 and the screen of the fourth output section 412 may be integrated into a touch panel. The fourth communication section 413 is an interface that communicates with other apparatuses. The fourth storage section 414 is a memory that stores various kinds of information. The print section 415 executes printing of an image to be printed on a medium such as a paper sheet.

The fourth control section 416 is a processor that performs various control processes. The registration information acquisition section 451 acquires registration information. In this embodiment, the registration information acquisition section 451 acquires registration information based on a result of reading by the reading section 431. The print control section 452 controls print processing. The payment control section 453 controls electronic payment processing.

In this embodiment, the user 31 of the information processing apparatus 11 and the user of the printing apparatus 14 may be the same user, or may be different users.

Figure 6:
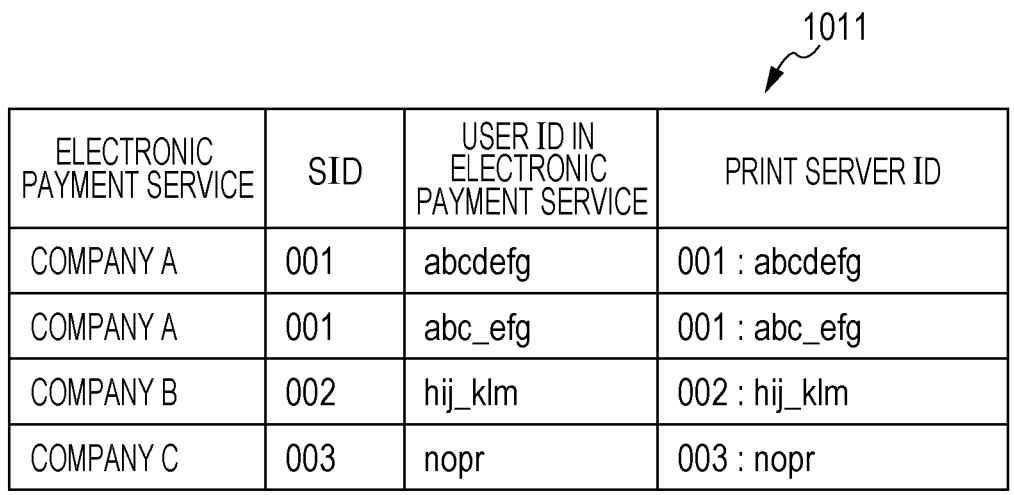
FIG. 6 illustrates an example correspondence relationship of print server IDs according to an embodiment.

FIG. 6 illustrates an example correspondence relationship 1011 of print server IDs according to the embodiment. The correspondence relationship 1011 shows a correspondence between an electronic payment service, a service ID that is an ID of the electronic payment service, a user ID that is an ID of the user 31 of the electronic payment service, and a print server ID. In the example in FIG. 6, the service ID is described as SID. In this embodiment, a service ID may be referred to as an SID for convenience in description. For example, different companies that provide electronic payment services have different SIDs for the electronic payment services respectively.

In the example in FIG. 6, the column of the electronic payment service shows, for example, company names such as "Company A", "Company B", and "Company C". Accordingly, in the column of the electronic payment service, a company that performs electronic payment processing is identified. By the identification of a company, a medium that is used for the electronic payment can be identified, for example, the electronic payment by a credit card or the electronic payment by a transportation IC card. The SID represents an ID of an electronic payment service, for example, "001", "002", or "003". The SID may uniquely identify the electronic payment server 12, for example. The user ID in an electronic payment service represents an ID of a user who uses an electronic payment service, for example, "abcdefg", "abc_efg", "hij_klm", or "nopr". For the user ID in an electronic payment service, for example, for each electronic payment service, information that can uniquely identify the user in the electronic payment service can be used.

The print server ID represents an ID of a cloud print server 13, for example, "001: abcdefg", "001: abc_efg", "002: hij_klm" or "003: nopr". In this embodiment, a print server ID includes an SID and a user ID in an electronic payment service. The print server ID may be, for example, a character string, or may not be a character string, or may be a reversible hash value or a reversible encrypted value. In this embodiment, the print server ID identifies a job for printing.

Figure 7:
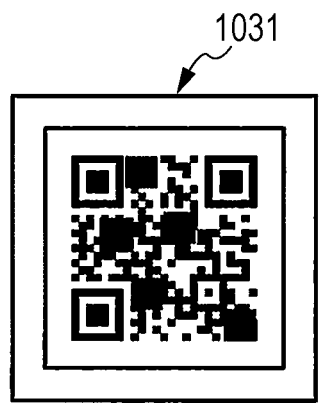
FIG. 7 illustrates an example two-dimensional code according to an embodiment.

FIG. 7 illustrates an example two-dimensional code 1031 according to the embodiment. The image of the two-dimensional code 1031 illustrated in FIG. 7 is a schematic image. The two-dimensional code 1031 may be, for example, a QR code (registered trademark), or may be any other image.

In this embodiment, the information represented by the two-dimensional code 1031 is used as registration information indicating that print data has been registered in the cloud print server 13. In this embodiment, the registration information that is represented by the two-dimensional code 1031 includes the information about a print server ID and the information about a payment token. The print server ID identifies registered print data. The payment token identifies an electronic payment service that is used in the print processing of the print data. It should be noted that the payment token may be invalidated, for example, when a predetermined time has elapsed since the payment token was issued. That is, a time-out period may be set to the payment token.

Figure 8:
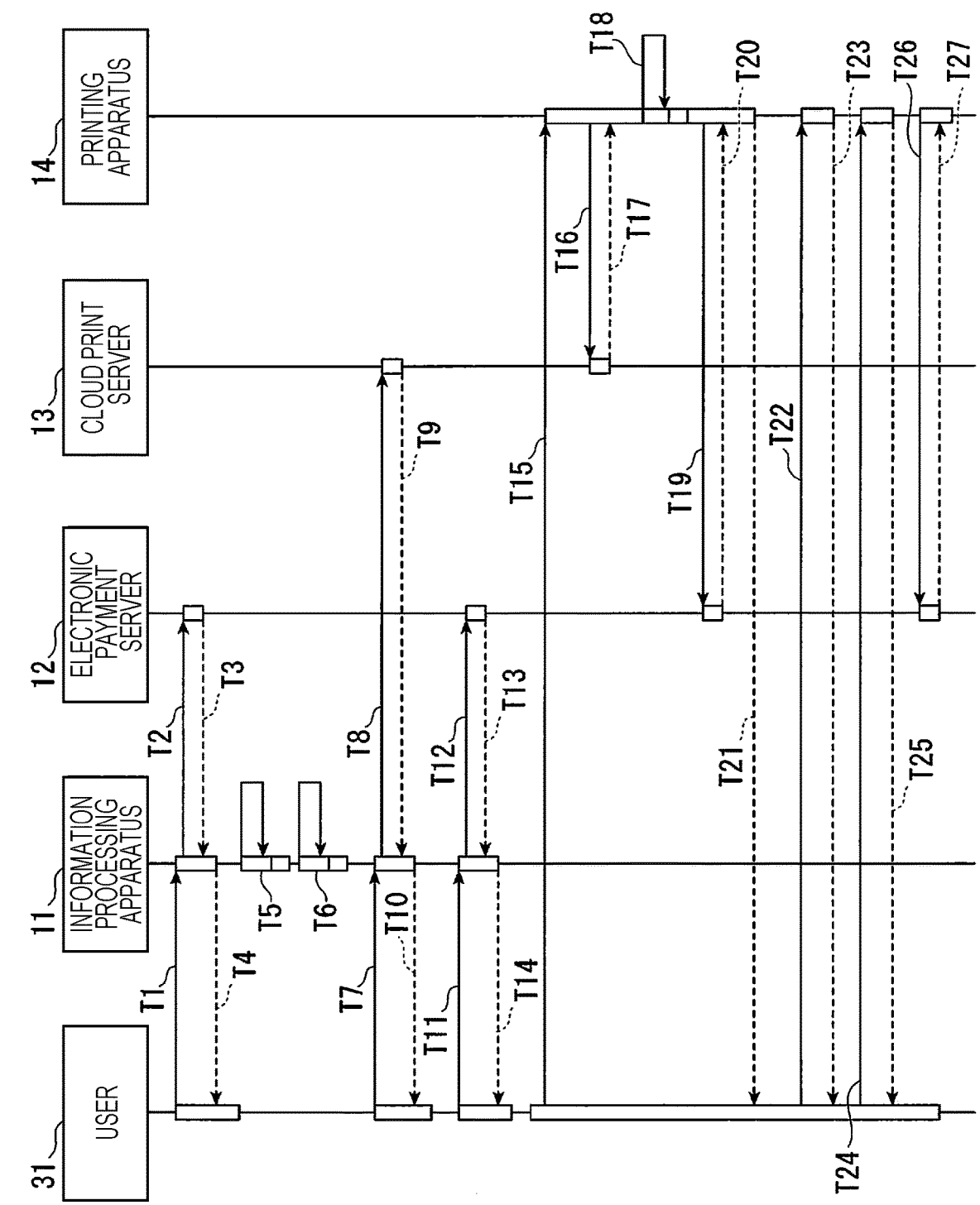
FIG. 8 illustrates an example sequence of processing that is performed in a printing system according to an embodiment.

FIG. 8 illustrates an example sequence of processing that is performed in the printing system 1 according to the embodiment. FIG. 8 schematically illustrates the user 31 who operates the information processing apparatus 11, the information processing apparatus 11, the electronic payment server 12, the cloud print server 13, and the printing apparatus 14. Hereinafter, a process T1 to a process T27 will be described.

Process T1

The user 31 operates the first input section 111 of the information processing apparatus 11 and inputs a predetermined instruction to the information processing apparatus 11. The instruction includes an instruction for selecting an electronic payment service and an instruction for information regarding the user 31 in the electronic payment service. The information includes a user ID and a password in the electronic payment service. The user ID and the password in the electronic payment service are known, for example, in advance by the user 31 or the information processing apparatus 11. In addition, the SID of the electronic payment service is known, for example, in advance by the information processing apparatus 11.

Process T2

The information processing apparatus 11 acquires the information regarding the instruction from the user 31 using the information acquisition section 131. The information processing apparatus 11, using the authentication request section 132, accesses the electronic payment server 12 that is selected based on the instruction. The information processing apparatus 11, using the authentication request section 132, based on the instruction, requests the electronic payment server 12 to authenticate the user 31 by transmitting the information regarding the user 31 to the electronic payment server 12 through the first communication section 114. Then, the electronic payment server 12 performs an authentication through the user ID of the user 31 and the password. In this embodiment, the authentication of the user 31 is successfully processed in the electronic payment server 12. When the authentication of the user 31 fails in the electronic payment server 12, no further processing is performed.

Process T3

When the authentication of the user 31 is successfully processed, using the payment authentication section 231, the electronic payment server 12 informs the information processing apparatus 11 that the authentication of the user 31 has been successfully processed.

Process T4

When the success of the authentication is informed from the electronic payment server 12, using the first output section 112, the information processing apparatus 11 informs the user 31 of the success of the authentication, for example, through the screen on the display section 113.

Process T5

The information processing apparatus 11 stores the information about the electronic payment service type and the information regarding the user 31 in the first storage section 115. In this embodiment, the SID is used as the information about the electronic payment service type.

Process T6

The information processing apparatus 11, using the identification information association section 151 of the print server identification information generation section 133, associates the identification information regarding the electronic payment service with the identification information regarding the cloud printing. By the processing, the information processing apparatus 11, using the print server identification generation section 133, combines the SID and the user ID into a print server ID. In this process, the identification information association section 151 stores the correspondence relationship 1011 illustrated in FIG. 6. By the processing, the identification information association section 151 associates the identification information regarding the electronic payment service with the identification information regarding the cloud printing and manages the information. The correspondence relationship 1011 may be stored, for example, in the first storage section 115.

Process T7

The user 31 uploads print data that is data to be printed to the information processing apparatus 11. The print data may be, for example, image data, and may include data of an imaged character. The print data may be, for example, jpg data, ping data, or bmp data. In addition, the print data may be, for example, PDF data that contains character information. The information processing apparatus 11 may convert, using a predetermined application, received print data into, for example, a page description language or a printer control code.

Process T8

The information processing apparatus 11, using the registration section 134, accesses the cloud print server 13. The information processing apparatus 11, using the registration section 134, transmits the received print data and the print server ID to the cloud print server 13 through the first communication section 114, and requests the cloud print server 13 to register the print data and the print server ID. In this case, for example, the information processing apparatus 11 requests the cloud print server 13 to perform an authentication, and after the authentication, requests the registration of the print data and other information. In this embodiment, the registration is successfully processed in the cloud print server 13. When the registration fails in the cloud print server 13, no further processing is performed.

Process T9

When the registration is successfully processed by the print registration section 331, the cloud print server 13 informs the information processing apparatus 11 of the success of the registration. By the processing, in the cloud print server 13, the information regarding the electronic payment service and the print data related to the print job can be associated with each other.

Process T10

When the success of the registration is informed from the cloud print server 13, using the first output section 112, the information processing apparatus 11 informs the user 31 of the success of the registration, for example, through the screen on the display section 113.

The processing after the process T11 is performed in accordance with an instruction from the user 31 when the print processing for the print data and the payment processing for the fee for the print processing are performed. In this embodiment, after the registration of the print data, the printing of the print data is performed, and in the processing, a two-dimensional code is issued. The processing after the process T11 may be performed, for example, immediately after the completion of the process T10, or at some time after the completion of the process T10.

Process T11

The user 31 operates the first input section 111 of the information processing apparatus 11 and inputs a request for issuing a two-dimensional code to the information processing apparatus 11.

Process T12

The information processing apparatus 11, using the authentication request section 132, requests the electronic payment server 12 to authenticate the user 31 by transmitting the information regarding the user 31 to the selected electronic payment server 12 through the first communication section 114. The information includes the user ID in the electronic payment service that is stored in the first storage section 115. In the authentication processing, for example, a password or the like may be used together with the user ID. In this embodiment, the authentication of the user 31 is successfully processed in the electronic payment server 12. When the authentication of the user 31 fails in the electronic payment server 12, no further processing is performed.

Process T13

In response to the request from the information processing apparatus 11, the electronic payment server 12, using the payment issuing section 232, issues a payment token as information regarding the payment. Then, the electronic payment server 12 transmits the information about the payment token through the second communication section 213 to the information processing apparatus 11.

Process T14

The information processing apparatus 11, based on the payment token that is transmitted from the electronic payment server 12, using the registration information processing section 135, stores the two-dimensional code in the first storage section 115. The information processing apparatus 11, using the registration information processing section 135, outputs the two-dimensional code through the first output section 112. In this embodiment, the first output section 112 displays the two-dimensional code, for example, using the display section 113. The two-dimensional code includes the print server ID to be printed and the information based on the payment token. The two-dimensional code may be, for example, generated in the information processing apparatus 11. Alternatively, the two-dimensional code may be, for example, generated in the electronic payment server 12 and transmitted to the information processing apparatus 11.

Process T15

The user 31 places the screen of the display section 113 of the information processing apparatus 11 over the reading section 431 of the printing apparatus 14 with the two-dimensional code displayed on the screen. By this operation, the user 31 can read the two-dimensional code with the reading section 431 of the printing apparatus 14. The printing apparatus 14, using the registration information acquisition section 451, acquires the registration information that is read by the reading section 431. In this embodiment, the registration information is represented in the form of the two-dimensional code.

Process T16

The printing apparatus 14, based on the registration information acquired by the registration information acquisition section 451, using the print control section 452, identifies a print server ID that is represented by the information included in the registration information, and transmits the print server ID through the fourth communication section 413 to the cloud print server 13.

Process T17

The cloud print server 13, based on the print server ID that is received from the printing apparatus 14 through the third communication section 313, using the print job processing section 332, acquires a list of print jobs and transmits the information about the print job list through the third communication section 313 to the printing apparatus 14.

Process T18

The printing apparatus 14, using the payment control section 453, based on the print server ID that is identified by the registration information, identifies an SID. By the processing, the printing apparatus 14 identifies an electronic payment service that corresponds to the SID.

Process T19

The printing apparatus 14, using the payment control section 453, confirms whether the payment token is valid by transmitting the payment token that is represented by the information included in the acquired registration information through the fourth communication section 413 to the electronic payment server 12 that corresponds to the identified payment service.

Process T20

The electronic payment server 12, using the payment determination section 233, determines whether the payment token that is received from the printing apparatus 14 through the second communication section 213 is valid. Then, the electronic payment server 12 transmits the information about the result determined by the payment determination section 233 through the second communication section 213 to the printing apparatus 14. The printing apparatus 14 receives the information from the electronic payment server 12 through the fourth communication section 413. In this embodiment, the information indicates that the payment token is valid. When the electronic payment server 12 determines that the payment token is invalid, no further processing is performed in the printing apparatus 14.

Process T21

The printing apparatus 14, using the fourth output section 412, displays the information about the print job list that is received from the cloud print server 13 for the user 31. The individual print jobs may be represented, for example, using data to be printed.

Process T22

The user 31 operates the fourth input section 411 of the printing apparatus 14 and inputs a predetermined instruction to the printing apparatus 14. The instruction includes, for example, an instruction for specifying a print job to be printed from the print job list, and an instruction for print settings. The print settings may include any setting items in the print processing, for example, an item for setting the number of print copies, or an item for setting color printing or monochrome printing.

Process T23

The printing apparatus 14, using the payment control section 453, determines a fee for the execution of the print job that is specified by the user 31. The printing apparatus 14, using the fourth output section 412, displays the information about the determined fee for the user 31.

Process T24

The user 31 presses a print start button in the fourth input section 411 of the printing apparatus 14. The print start button is a button for receiving an instruction for starting printing.

Process T25

In response to the pressing of the print start button by the user 31, using the print control section 452, the printing apparatus 14 creates the print product 41 of the target print job using the print section 415. The printing apparatus 14 may set print settings for print processing, for example, using the print control section 452, in accordance with contents as a result of the operation of the fourth input section 411 by the user 31.

Process T26

The printing apparatus 14, using the payment control section 453, requests the electronic payment server 12 to process the electronic payment by transmitting the payment token that corresponds to the processed print job through the fourth communication section 413 to the electronic payment server 12.

Process T27

Based on the payment token transmitted from the printing apparatus 14 and received through the second communication section 213, the electronic payment server 12 ends the electronic payment processing by accessing the electronic payment processing apparatus 15 and completing the electronic payment using the payment execution section 234. By the processing, based on the registration information, the electronic payment is performed. Then, the electronic payment server 12 transmits the information about the completion of the electronic payment through the second communication section 213 to the printing apparatus 14. The printing apparatus 14 receives the information from the electronic payment server 12 through the fourth communication section 413.

In this embodiment, after the completion of the print processing of the print data by the printing apparatus 14, the electronic payment of the fee for the print processing is performed. In another embodiment, after the completion of the electronic payment of the fee for the print processing of the print data by the electronic payment server 12, the print processing of the print data may be performed by the printing apparatus 14. The print processing and the electronic payment processing for the fee for the print processing may be performed at any timings respectively.

FIG. 9 illustrates an example procedure of the processing that is performed in the information processing apparatus 11 according to the embodiment. FIG. 9 illustrates the electronic payment server 12 and the cloud print server 13 for reference. The processing in step S1 to S8 will be described.

Step S1

The information processing apparatus 11 receives, using the first input section 111, from the user 31, an instruction for selecting an electronic payment service and an instruction for information regarding the user 31 in the electronic payment service. Then, the processing proceeds to step S2.

Step S2

The information processing apparatus 11, using the authentication request section 132, requests the electronic payment server 12 to authenticate the user 31 by transmitting the received information regarding the user 31 to the selected electronic payment server 12 through the first communication section 114. Then, the processing proceeds to step S3.

Step S3

The information processing apparatus 11, based on the information from the electronic payment server 12, using the authentication request section 132, determines whether the authentication is successfully processed. In this embodiment, the content of the information indicates the success of the authentication or the failure of the authentication. As a result of the determination, when the authentication request section 132 of the information processing apparatus 11 determines that the authentication is processed successfully (step S3: YES), the processing proceeds to step S4. On the other hand, as a result of the determination, when the authentication request section 132 of the information processing apparatus 11 determines that the authentication fails (step S3: NO), the processing proceeds to step S8.

Step S4

The information processing apparatus 11, using the print server identification information generation section 133, generates a print server ID. Then, the processing proceeds to step S5.

Step S5

The information processing apparatus 11, using the information acquisition section 131, receives and acquires the print data that is specified by the user 31. Then, the processing proceeds to step S6.

Step S6

The information processing apparatus 11, using the registration section 134, requests the cloud print server 13 to register the acquired print data and print server ID. Then, the processing proceeds to step S7.

Step S7

The information processing apparatus 11, based on a response from the cloud print server 13, using the registration section 134, determines whether the registration is successfully processed. In this embodiment, the content of the response indicates the success of the registration or the failure of the registration. As a result of the determination, when the registration section 134 of the information processing apparatus 11 determines that the registration is processed successfully (step S7: YES), the processing ends. On the other hand, as a result of the determination, when the registration section 134 of the information processing apparatus 11 determines that the registration fails (step S7: NO), the processing proceeds to step S8.

Step S8

The information processing apparatus 11, using the first output section 112, for example, outputs information that indicates an error. The information may be, for example, displayed on the screen in the display section 113. Then, the processing flow ends.

As described above, the printing system 1 according to the embodiment performs the following control processing. The information processing apparatus 11 in the printing system 1, using electronic payment identification information regarding an electronic payment service, requests the electronic payment server 12 in the printing system 1 to perform an authentication. In this embodiment, the electronic payment identification information includes information including a user ID and a password. The information processing apparatus 11, using information that is associated with the electronic payment identification information as print identification information regarding cloud printing, requests the cloud print server 13 in the printing system 1 to perform an authentication. After the authentication, the print identification information is associated with the electronic payment service and the print data is registered in the cloud print server 13. In this embodiment, the print identification information is a print server ID. The information processing apparatus 11 acquires the registration information regarding the electronic payment service and the cloud printing. The printing apparatus 14 in the printing system 1 reads the registration information that is acquired by the information processing apparatus 11, performs the printing of the print data that is registered in the cloud print server 13 based on the registration information, and based on the registration information, requests the electronic payment server 12 that corresponds to the electronic payment service based on the registration information to perform the electronic payment.

Accordingly, such a method of controlling the printing system 1 enables collective and smooth handling of the cloud printing and the electronic payment, for example, when a company that provides the cloud printing service and a company that provides the electronic payment service are different companies. Such a method of controlling the printing system 1 can provide the user 31 with less burdensome handling in specifying a print job, executing the printing, and executing the electronic payment regarding the printing.

As described above, the printing system 1 according to the embodiment enables the user 31 to collectively handle both the cloud printing service and the electronic payment service without individually handling them, for example, using one application in the information processing apparatus 11, and thus the convenience in the cloud printing service involving electronic payment can be increased.

More specifically, in the printing system 1 according to the embodiment, for example, when the user 31 prints an image stored in the cloud using the printing apparatus 14 that is installed in a convenience store or some other place, the cloud printing authentication is associated with the electronic payment authentication in advance, and thus the user 31 can execute the printing and the electronic payment without individual authentications.

In the printing system 1 according to the embodiment, the registration information is a two-dimensional code. Consequently, according to the method of controlling the printing system 1, the user 31 can use the two-dimensional code and readily execute the printing and electronic payment.

In addition, in the printing system 1 according to the embodiment, after the completion of the electronic payment by the electronic payment server 12, the printing of print data is started by the printing apparatus 14. Consequently, according to the method of controlling the printing system 1, after the payment of the fee for the printing is ensured, the printing is executed.

In addition, in the printing system 1 according to the embodiment, after the completion of the printing of the print data by the printing apparatus 14, the electronic payment processing is executed by the electronic payment server 12. Consequently, according to the method of controlling the printing system 1, after the completion of the printing, the payment of the fee for the printing that has been actually executed can be executed.

In addition, this embodiment may be implemented as a program to be executed in the information processing apparatus 11. For example, a program causes a computer in the information processing apparatus 11 to implement a function of requesting an authentication using electronic payment identification information regarding an electronic payment service, a function of requesting an authentication using information that is associated with the electronic payment identification information as print identification information regarding cloud printing, after the authentication, a function of associating print data with the electronic payment service and registering the print data, a function of storing the registration information regarding the electronic payment service and the cloud printing, and a function of outputting the registration information.

It should be noted that a program for implementing the functions of any component in any one of the information processing apparatus 11, the electronic payment server 12, the cloud print server 13, the printing apparatus 14, and other apparatuses may be recorded on a computer-readable storage medium, and the program may be loaded into a computer system and implemented. The "computer system" here includes an operating system or hardware such as a peripheral device. The "computer-readable storage medium" is a portable medium such as a flexible disk, a magneto-optical disk, a read-only memory (ROM), or a compact disk (CD)-ROM, or a storage device that is built into the computer system such as a hard disk. In addition, the "computer-readable storage medium" may be a medium that can store a program for a certain period of time such as a volatile memory in a server or in a computer system that is a client when a program is transmitted through a network such as the Internet or a communications line such as a telephone line. The volatile memory may be, for example, a RAM. The storage medium may be, for example, a non-transitory storage medium.

The program may be transmitted from a computer system that stores the program in a storage device or the like to another computer system via a transmission medium or by transmission waves in a transmission medium. Here, the "transmission medium" that transmits the program is a medium that has a function of transmitting information, for example, a network such as the Internet or a communications line such as a telephone line. The program may implement a part of the functions described above. The program may be a program that can implement the functions described above in combination with a program that has already been stored in a computer system, that is, a difference file. The difference file may be referred to as a difference program.

The function of any component in any of the information processing apparatus 11, the electronic payment server 12, the cloud print server 13, the printing apparatus 14, and other apparatuses may be implemented by a processor. For example, each process in the embodiments may be implemented by a processor that operates based on information such as a program and a computer-readable storage medium that stores information such as a program. Here, the processor, for example, may have the functions of the components that are implemented by separate hardware, or the functions of the components that are implemented by integrated hardware. For example, the processor may include hardware, and the hardware may include at least one of a circuit that processes digital signals and a circuit that processes analog signals. For example, the processor may be one or more circuit devices mounted on a circuit board, or one or both of the one or more circuit devices and one or more circuit elements. The circuit device may be an integrated circuit (IC), and the circuit element may be a resistor or a capacitor.

The processor may be, for example, a central processing unit (CPU). It should be noted that the processor is not limited to the CPU, for example, may be various processors such as a graphics processing unit (GPU) or a digital signal processor (DSP). The processor may be, for example, a hardware circuit implemented by an application specific integrated circuit (ASIC). The processor may include, for example, a plurality of CPUs or a hardware circuit that includes a plurality of ASICs. The processor may include, for example, a combination of a plurality of CPUs and a hardware circuit that includes a plurality of ASICs. The processor may include, for example, at least one of an amplifier circuit and a filter circuit that process analog signals.

While the embodiments of the present disclosure have been described in detail with reference to the drawings, it is to be understood that the specific configurations are not limited to these configurations according to the embodiments, design choices can be made without departing from the scope of the disclosure.

What is claimed is:

1. A method of controlling a printing system including an information processing apparatus, an electronic payment server, a cloud print server, and a printing apparatus, the method comprising:

requesting, by the information processing apparatus, using electronic payment identification information regarding an electronic payment service, the electronic payment server to perform an authentication;

requesting, by the information processing apparatus using information that is associated with the electronic payment identification information as print identification information regarding cloud printing, the cloud print server to perform an authentication, and after the authentication by the cloud print server, registering, in the cloud print server, print data that is associated with the electronic payment service;

acquiring, by the information processing apparatus, registration information regarding the electronic payment service and the cloud printing, the registration information being a two-dimensional code indicative of the print data being registered with the cloud print server and a payment token associated with the electronic payment service; and reading, by the printing apparatus, the registration information that is acquired by the information processing apparatus, performing printing of the print data that is registered in the cloud print server based on the registration information, and based on the registration information, requesting the electronic payment server that corresponds to the electronic payment service based on the registration information to perform an electronic payment.

2. The method of controlling the printing system according to claim 1, wherein after completion of an electronic payment processing by the electronic payment server, the printing of the print data is started by the printing apparatus.

3. The method of controlling the printing system according to claim 1, wherein after completion of the printing of the print data by the printing apparatus, an electronic payment processing is executed by the electronic payment server.

4. A non-transitory computer-readable storage medium storing a program for causing a computer in an information processing apparatus coupled to an electronic payment server and a cloud print server to implement functions, the program causing the computer in the information processing apparatus to implement functions comprising:

requesting, using electronic payment identification information regarding an electronic payment service, the electronic payment server to perform an authentication;

requesting, using information that is associated with the electronic payment identification information as print identification information regarding cloud printing, the cloud print server to perform an authentication, and after the authentication, and registering print data that is associated with the electronic payment service;

storing registration information regarding the electronic payment service and the cloud printing; and outputting the registration information, the registration information being a two-dimensional code indicative of the print data being registered with the cloud print server and a payment token associated with the electronic payment service.

* * * * *